(12) United States Patent
Lin

(10) Patent No.: US 8,009,434 B2
(45) Date of Patent: Aug. 30, 2011

(54) TOUCH CONTROL PANEL

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 612 days.

(21) Appl. No.: 12/181,482

(22) Filed: Jul. 29, 2008

(65) Prior Publication Data

US 2010/0027226 A1 Feb. 4, 2010

(51) Int. Cl.
*H05K 5/00* (2006.01)
*G06F 3/041* (2006.01)
*A47J 31/06* (2006.01)

(52) U.S. Cl. ............................ 361/752; 345/173; 99/285

(58) Field of Classification Search ............. 361/679.01, 361/748, 752, 810; 345/173; 99/279, 280, 99/285

See application file for complete search history.

(56) References Cited

U.S. PATENT DOCUMENTS

| | | | | |
|---|---|---|---|---|
| 2,776,074 A | * | 1/1957 | St Laurence | 222/2 |
| 5,375,508 A | * | 12/1994 | Knepler et al. | 99/280 |
| 5,463,932 A | * | 11/1995 | Olson | 99/280 |
| 5,487,053 A | * | 1/1996 | Beiswenger et al. | 368/69 |
| 5,724,883 A | * | 3/1998 | Usherovich | 99/290 |
| 5,862,738 A | * | 1/1999 | Warne | 99/281 |
| 5,901,634 A | * | 5/1999 | Vancamp et al. | 99/281 |
| 5,943,044 A | * | 8/1999 | Martinelli et al. | 345/174 |
| 6,095,031 A | * | 8/2000 | Warne | 99/282 |
| 6,222,525 B1 | * | 4/2001 | Armstrong | 345/161 |
| 6,269,735 B1 | * | 8/2001 | Rolfes | 99/279 |
| 6,415,707 B1 | * | 7/2002 | Armstrong | 99/280 |
| 6,739,241 B2 | * | 5/2004 | Long et al. | 99/288 |
| 7,069,091 B2 | * | 6/2006 | Williamson | 700/90 |
| 7,151,968 B2 | * | 12/2006 | Williamson | 700/65 |
| 7,654,191 B2 | * | 2/2010 | Greenwald et al. | 99/275 |
| 7,677,159 B2 | * | 3/2010 | Francois | 99/323.3 |
| 2002/0020300 A1 | * | 2/2002 | Koncelik, Jr. | 99/285 |
| 2003/0076306 A1 | * | 4/2003 | Zadesky et al. | 345/173 |
| 2003/0079613 A1 | * | 5/2003 | Williamson | 99/282 |
| 2004/0032421 A1 | * | 2/2004 | Williamson et al. | 345/704 |
| 2004/0058706 A1 | * | 3/2004 | Williamson et al. | 455/557 |
| 2004/0156170 A1 | * | 8/2004 | Mager et al. | 361/683 |
| 2005/0016385 A1 | * | 1/2005 | Brinkemper et al. | 99/280 |
| 2006/0219102 A1 | * | 10/2006 | Geroult et al. | 99/495 |
| 2007/0055387 A1 | * | 3/2007 | Williamson | 700/17 |
| 2008/0037232 A1 | * | 2/2008 | Schroetlin | 361/760 |
| 2008/0094372 A1 | * | 4/2008 | Philipp | 345/173 |
| 2008/0113766 A1 | * | 5/2008 | Waxman et al. | 463/25 |
| 2008/0183330 A1 | * | 7/2008 | Monn | 700/239 |
| 2009/0095165 A1 | * | 4/2009 | Nosler et al. | 99/289 R |
| 2009/0177318 A1 | * | 7/2009 | Sizemore | 700/236 |
| 2009/0293733 A1 | * | 12/2009 | Martin et al. | 99/280 |

* cited by examiner

*Primary Examiner* — Jinhee J Lee
*Assistant Examiner* — Adrian S Wilson
(74) *Attorney, Agent, or Firm* — Alan Kamrath; Kamrath & Associates PA

(57) ABSTRACT

A touch control panel for use with a coffeemaker is disclosed. In the touch control panel, a PC board unit provided with backlight plates and a printed panel are secured to an inner side of a front decorative cover, made of a transparent material, with threaded fasteners. Protrusions formed on the front decorative cover and on an upper front decorative cover are engaged with corresponding cavities on a back panel. A back panel cover is engaged in the back panel at a location adjacent to a rear side of the PC board unit. An upper decorative strip and a lower decorative strip are affixed to an outer side of the front decorative cover. The touch control panel is secured to a front side of an upper body and of a lower body of the coffeemaker to serve both decorative and functional purposes.

5 Claims, 4 Drawing Sheets

TOUCH CONTROL PANEL

BACKGROUND OF THE INVENTION

1. Technical Field

The present invention relates to a touch control panel, and more particularly, to a touch control panel comprising a front decorative cover made of a transparent material for covering touch control switches and thereby keeping the touch control switches clean.

2. Description of Related Art

In order to offer fashionable coffeemakers, relevant manufactures keep developing different models with various combinations of forms and colors to suit diversified consumer needs. However, existing coffeemakers are mostly formed with panels provided with conventional pushbutton switches, which rise above the panel surface.

In recent years, there has been a global trend for domestic appliances to use the latest technology and adopt a cool or stylish exterior design. This trend has also affected the market of panels for use with electric appliances. Consequently, the membrane switch, which integrates keys having switch functions with characters, labels, trademarks and a transparent display window, has emerged and been widely employed in all kinds of industrial and domestic electric products, such as medical instruments, photocopiers, microwave stoves, electric fans, washing machines and coffeemakers.

However, both the pushbutton switches and membrane switches mentioned above have their drawbacks. For example, a pushbutton switch is surrounded by a gap, easily covered by dust, and hard to wipe clean. On the other hand, a membrane switch is subject to wear and tear after long-term use, so that the membrane on the switch surface may be broken where it is most frequently pressed, or even fall off as a result, thereby exposing the hidden switch heads.

BRIEF SUMMARY OF THE INVENTION

In view of the shortcomings of the aforesaid switches, the present invention provides a new panel-based switch design that is free of gaps, dust-proof and easy to wipe clean, so as to serve both decorative and functional purposes.

A primary objective of the present invention is to provide a touch control panel. Therein a PC board unit provided with backlight plates and a printed panel are secured to an inner side of a front decorative cover, made of a transparent material, with threaded fasteners. Protrusions formed on the front decorative cover and on an upper front decorative cover are engaged with corresponding cavities on a back panel. A back panel cover is engaged in the back panel at a location adjacent to a rear side of the PC board unit. An upper decorative strip and a lower decorative strip are affixed to an outer side of the front decorative cover. The touch control panel is secured to a front side of an upper body and of a lower body of a coffeemaker to serve both decorative and functional purposes.

BRIEF DESCRIPTION OF THE SEVERAL VIEWS OF THE DRAWINGS

The invention as well as a preferred mode of use, further objectives and advantages thereof will best be understood by reference to the following detailed description of an illustrative embodiment when read in conjunction with the accompanying drawings, wherein.

DETAILED DESCRIPTION OF THE INVENTION

Figure 1:
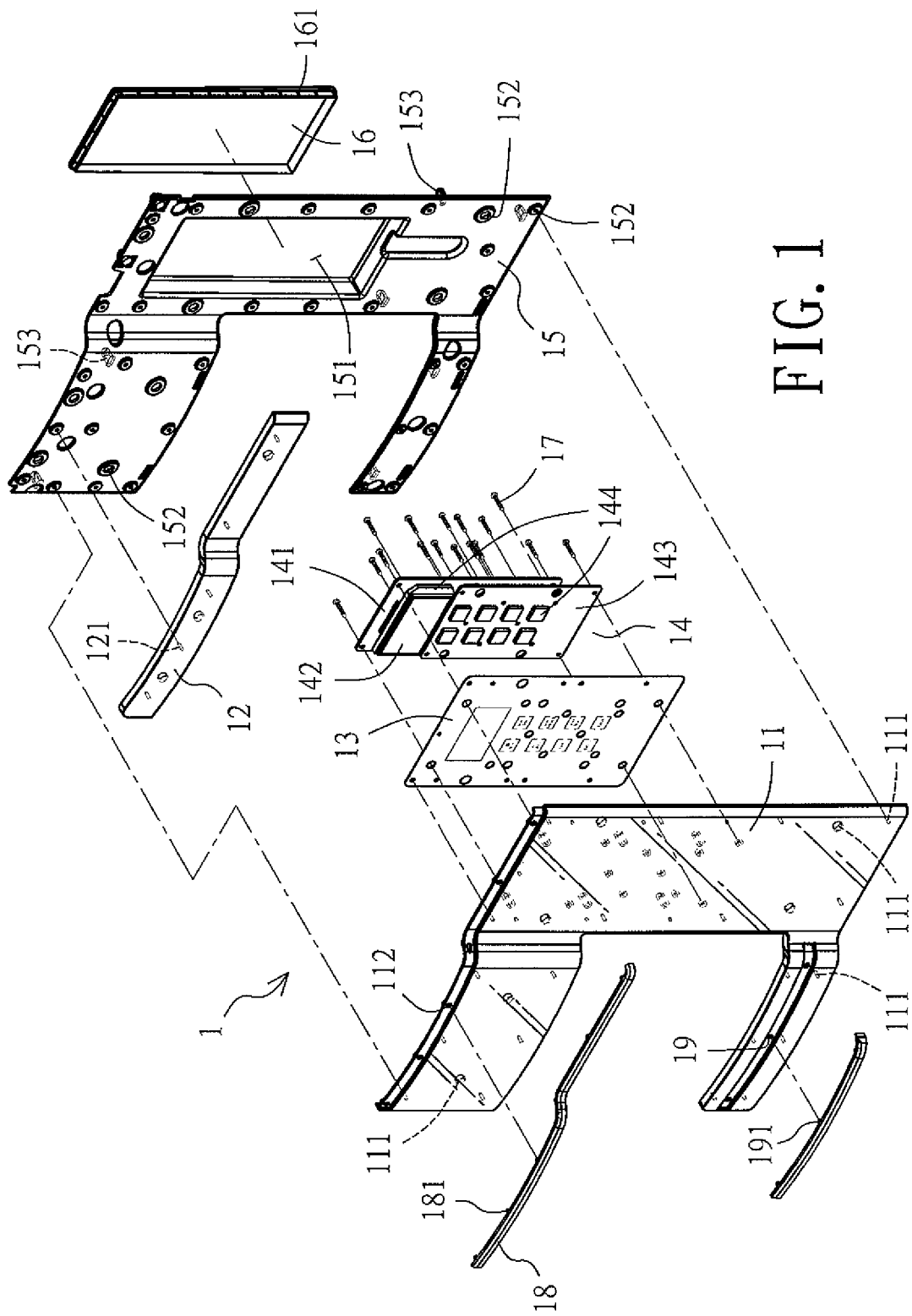
FIG. 1 is an exploded, perspective view of a touch control panel according to the present invention.

Referring to FIG. 1, a touch control panel 1 according to the present invention comprises a front decorative cover 11, an upper front decorative cover 12, a printed panel 13, a PC board unit 14, a back panel 15 and a back panel cover 16.

The front decorative cover 11 is made of a transparent material according to a widthwise shape of a front surface of an upper and lower body 21, 22 of a coffeemaker 2. A plurality of protrusions 111 and cavities 112 are formed on an inner side and an outer side of the front decorative cover 11, respectively.

The upper front decorative cover 12 has an inner side formed with a plurality of protrusions 121.

The printed panel 13 is printed with characters and patterns corresponding in position to touch control keys and a display window of the PC board unit 14.

The PC board unit 14 comprises a circuit board 141, a display window plate 142 and a touch control keyboard 143. A backlight plate 144 is provided on the display window of the display window plate 142 and each of the touch control keys of the touch control keyboard 143 (including a power switch key and various function keys).

The back panel 15 is shaped widthwise according to the front decorative cover 11 and the upper front decorative cover 12, and has a lateral portion formed with an opening 151. The back panel 15 is further provided with a plurality of cavities 152 corresponding in position to the protrusions 111 on the front decorative cover 11. In addition, the back panel 15 has a rear side formed protrudingly with a plurality of lugs 153.

The back panel cover 16 is shaped widthwise according to the opening 151 of the back panel 15, and has a peripheral edge formed with a plurality of engaging portions 161.

Figure 2:
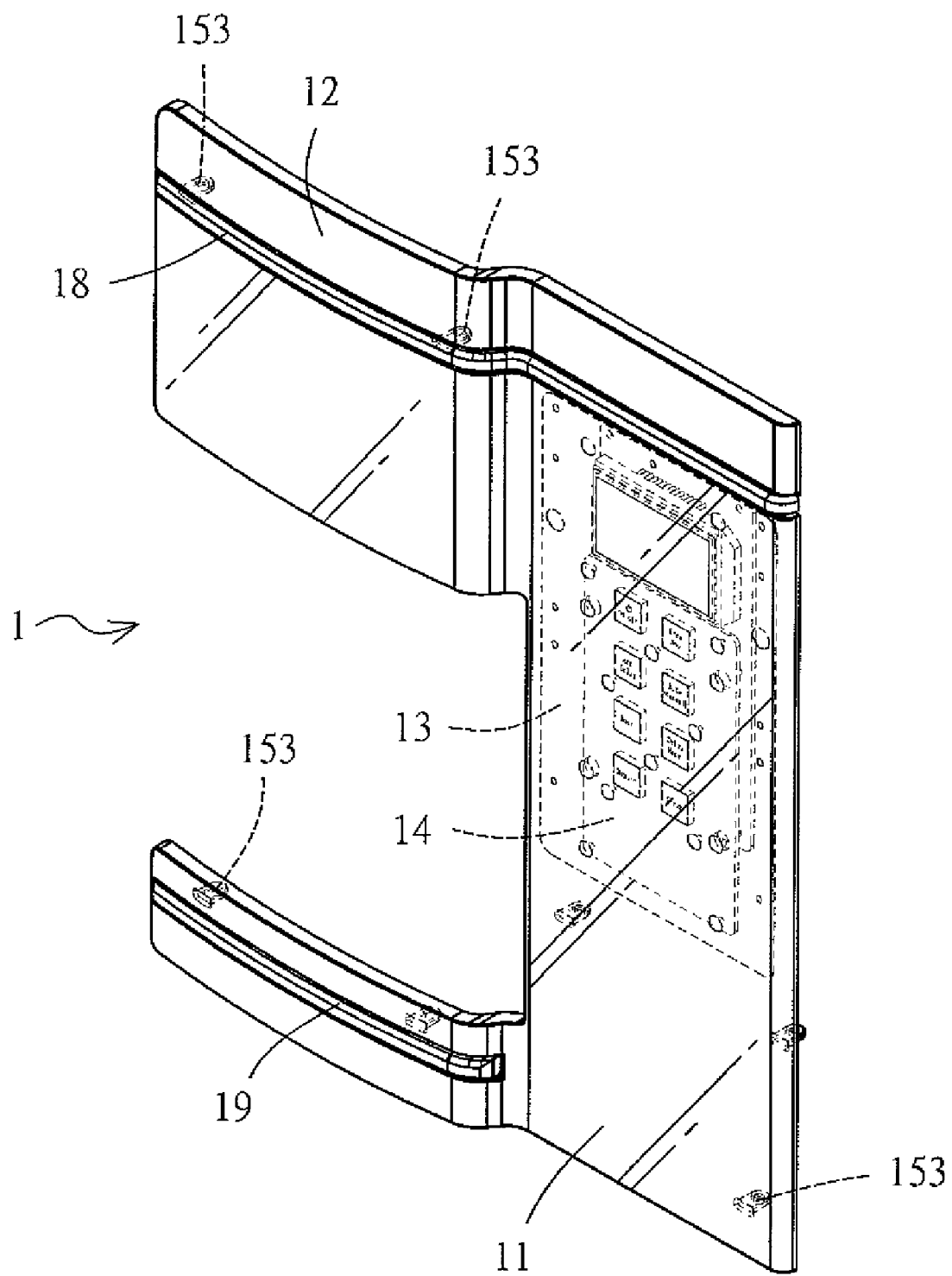
FIG. 2 is a perspective view of the touch control panel according to the present invention.

Referring to FIGS. 1 and 2, the touch control panel 1 is assembled in the following manner. Firstly, the PC board unit 14 and the printed panel 13 are secured with threaded fasteners 17 to the inner side of the front decorative cover 11. Secondly, the protrusions 111 and 121 on the front decorative cover 11 and the upper front decorative cover 12 are engaged with the corresponding cavities 152 on the back panel 15, so that the PC board unit 14 is received in the opening 151 of the back panel 15. Then, the back panel cover 16 is engaged in the back panel 15 to cover the PC board unit 14. Finally, protrusions 181 and 191 formed respectively on an upper decorative strip 18 and a lower decorative strip 19 are engaged with the cavities 112 on the outer side of the front decorative cover 11.

Figure 3:
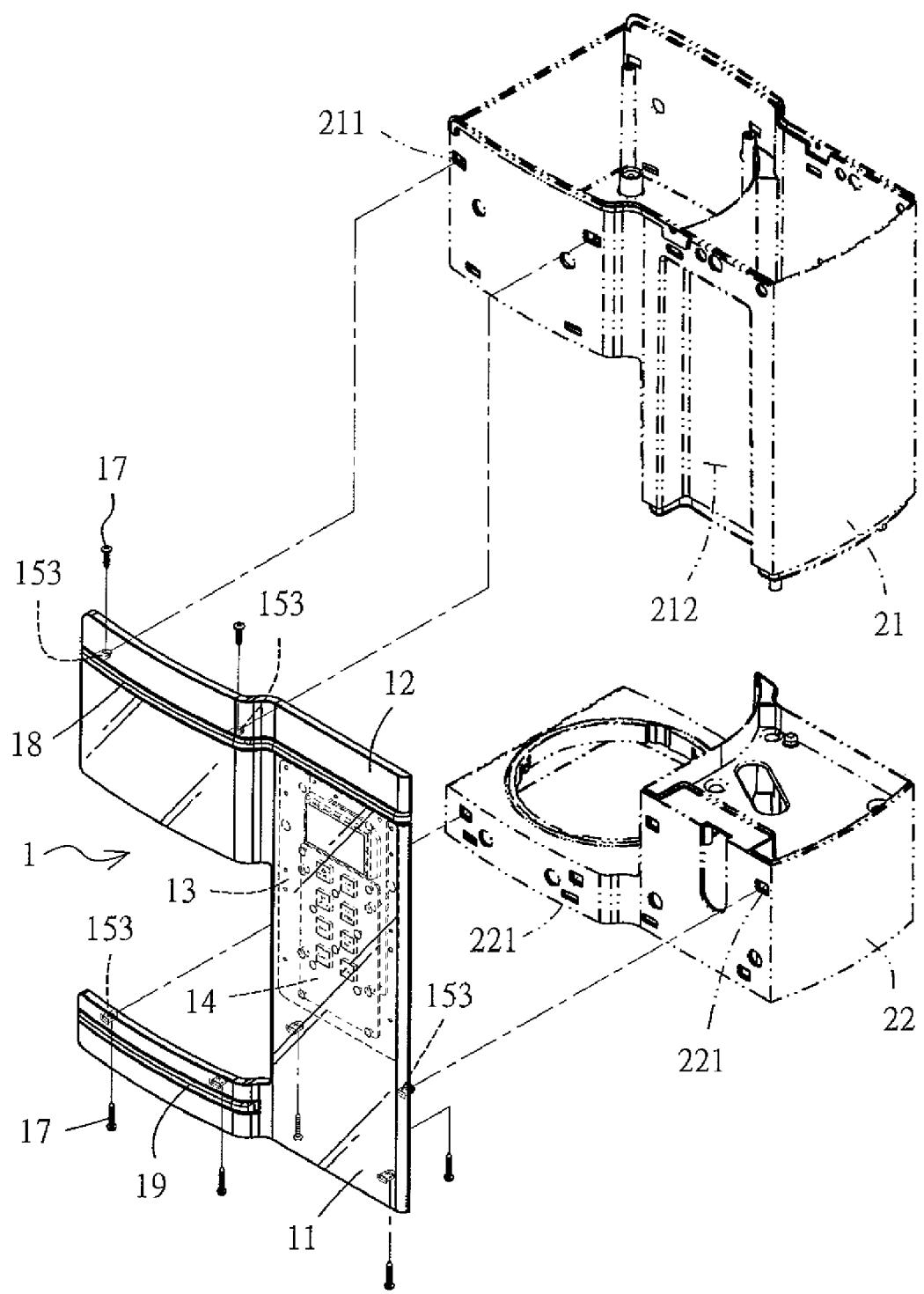
FIG. 3 is a schematic drawing showing how to assemble the touch control panel according to the present invention with a coffeemaker.
Figure 4:
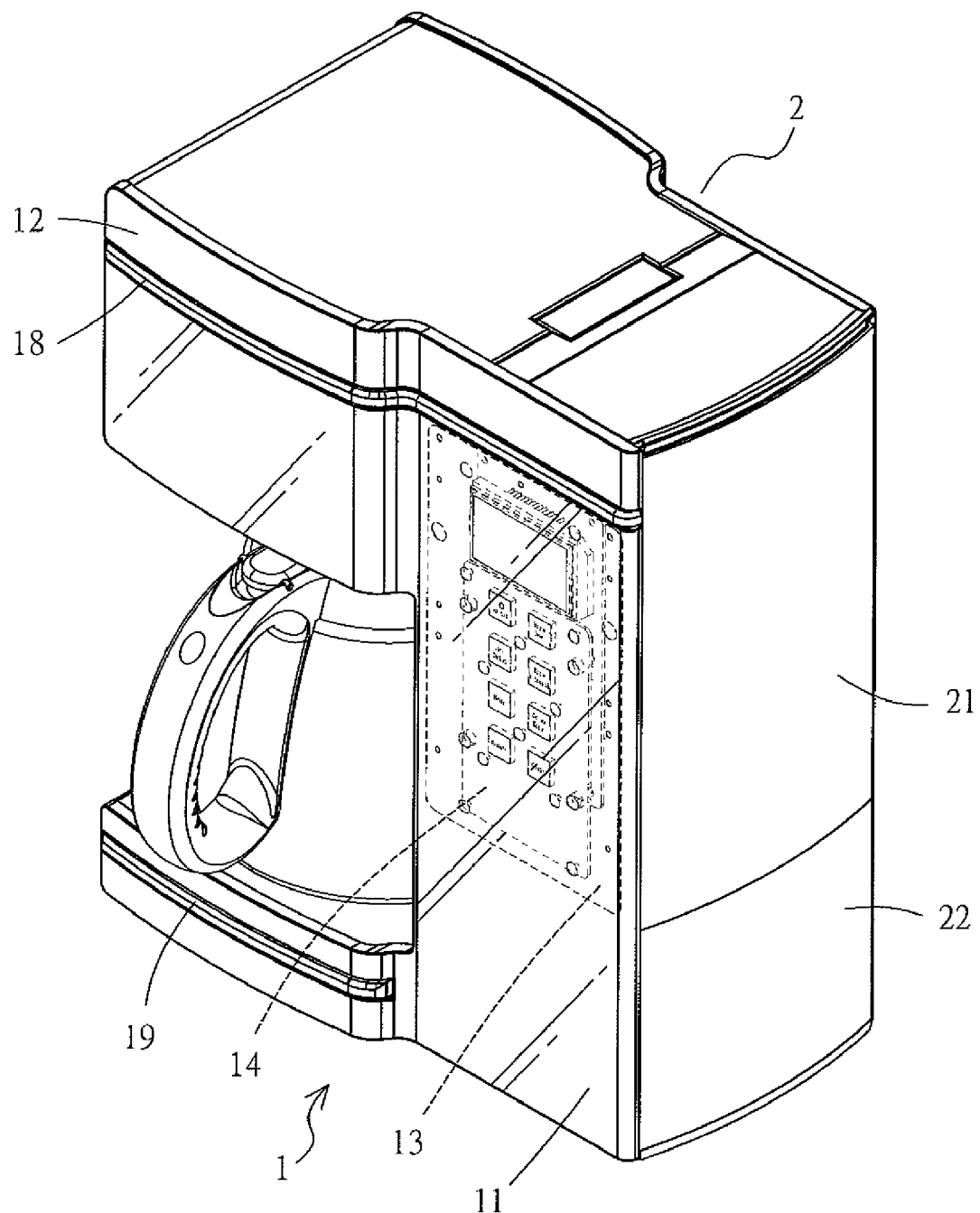
FIG. 4 is a perspective view of the coffeemaker assembled with the touch control panel according to the present invention.

Referring now to FIGS. 3 and 4, the touch control panel 1 is assembled with the coffeemaker 2 in the following way. The plurality of lugs 153 protruding from the rear side of the back panel 15 are directly inserted into corresponding through holes 211 and 221 on the upper and lower bodies 21 and 22, so that the PC board unit 14 is sunken into an accommodating space 212 concavely formed on the upper body 21. Then, the touch control panel 1 is secured in place to the upper and lower bodies 21 and 22 with more threaded fasteners 17. Thus, easy operation can be achieved with the front decorative cover 11 made of a transparent material. A user can perform touch control operation simply by touching the front decorative cover 11 at locations corresponding to the keys on the PC board unit 14.

When the coffeemaker 2 is plugged in and in a stand-by mode, the display window and the power switch key of the PC board unit 14 are illuminated by the corresponding backlight plates 144, allowing the characters or patterns on the printed panel 13 to be seen through the transparent front decorative cover 11. When it is desired to use the coffeemaker 2, the user only has to gently touch the power switch key to turn on the backlight plates 144 of all the other function keys instantly, so as to facilitate function selection.

In addition, the upper and lower decorative strips 18 and 19 may have different colors to match the front decorative cover 11 and the upper front decorative cover 12. The front decorative cover 11 may also be made of a transparent material having a pale color, so that the entire touch control panel 1 has a more distinctive color.

The touch control panel 1 having the aforementioned configuration provides the following advantages:

1. Since there are no exposed gaps between the keys of the touch control panel 1, the panel can be easily wiped clean if accidentally tainted by coffee.
2. During operation, the user presses the keys on the PC board unit 14 without making physical contact with the keys. Therefore, the keys are protected from wear and tear, so that the hidden pushbutton heads will not be exposed.
3. The front decorative cover 11, the upper front decorative cover 12, the upper decorative strip 18 and the lower decorative strip 19 may each have a different color to facilitate color matching.
4. The touch control panel 1 can be rapidly assembled to the coffeemaker 2 with only a few threaded fasteners 17.

The invention claimed is:

1. A touch control panel for being installed on a front side of a coffeemaker and used as an operation panel for function selection, characterized in:
    a PC board unit and a printed panel being secured, with threaded fasteners, to an inner side of a front decorative cover made of a transparent material;
    protrusions formed on the front decorative cover and on an upper front decorative cover being engaged with corresponding cavities on a back panel; and
    a back panel cover being engaged in the back panel at a location adjacent to a rear side of the PC board unit;
    wherein the touch control panel is secured to a front side of an upper body and of a lower body of the coffeemaker to serve both decorative and functional purposes.

2. The touch control panel of claim 1, wherein the front decorative cover has an outer side affixed with an upper decorative strip and a lower decorative strip.

3. The touch control panel of claim 1, wherein the back panel cover has a peripheral edge formed with a plurality of engaging portions for providing securer engagement.

4. The touch control panel of claim 1, wherein the PC board unit comprises a circuit board, a display window plate and a touch control keyboard.

5. The touch control panel of claim 4, wherein a backlight plate is provided on a display window of the display window plate and on each of touch control keys of the touch control keyboard.

* * * * *